United States Patent
Karlsson

(10) Patent No.: US 7,513,072 B2
(45) Date of Patent: Apr. 7, 2009

(54) METHOD FOR PRODUCTION OF ELECTRIC SIGNS AND AN ELECTRIC SIGN

(76) Inventor: Dennis Karlsson, PL. 1153 Hol. SE-441 93, Alingsås (SE)

( * ) Notice: Subject to any disclaimer, the term of this patent is extended or adjusted under 35 U.S.C. 154(b) by 24 days.

(21) Appl. No.: 10/551,141

(22) PCT Filed: Apr. 5, 2004

(86) PCT No.: PCT/SE2004/000523

§ 371 (c)(1),
(2), (4) Date: Sep. 29, 2005

(87) PCT Pub. No.: WO2004/102511

PCT Pub. Date: Nov. 25, 2004

(65) Prior Publication Data

US 2006/0179695 A1    Aug. 17, 2006

(30) Foreign Application Priority Data

Apr. 3, 2003   (SE) ................................. 0300995

(51) Int. Cl.
| G09F 13/18 | (2006.01) |
| G09F 15/00 | (2006.01) |
| G09F 15/02 | (2006.01) |
| B23K 26/04 | (2006.01) |
| B23K 26/00 | (2006.01) |
| F21V 7/04  | (2006.01) |

(52) U.S. Cl. .................. 40/546; 40/606.14; 40/606.16; 219/121.62; 219/121.69; 362/604

(58) Field of Classification Search .............. 40/606.14, 40/605, 606.16, 546, 800; 219/121.69, 121.8, 219/121.68, 121.62; 362/604; 216/65
See application file for complete search history.

(56) References Cited

U.S. PATENT DOCUMENTS

| 3,241,256 | A | * | 3/1966 | Viret et al. ..................... 40/546 |
| 4,028,828 | A | * | 6/1977 | Chao et al. ..................... 40/552 |
| 4,166,332 | A | * | 9/1979 | Donovan ..................... 40/605 |
| 5,369,553 | A | * | 11/1994 | Trusiani ..................... 362/604 |
| 5,880,430 | A | * | 3/1999 | Wein ..................... 219/121.69 |
| 6,275,339 | B1 | | 8/2001 | Chazallet et al. |
| 6,407,361 | B1 | * | 6/2002 | Williams ............... 219/121.69 |
| 6,467,922 | B1 | | 10/2002 | Blant et al. |
| 6,612,055 | B2 | * | 9/2003 | Bradford ..................... 40/546 |
| 2003/0012010 | A1 | | 1/2003 | Michaelidis et al. |
| 2004/0245225 | A1 | * | 12/2004 | Kastalsky .............. 219/121.69 |

* cited by examiner

*Primary Examiner*—Paul N Dickson
*Assistant Examiner*—Syed A Islam
(74) *Attorney, Agent, or Firm*—Jeffrey S. Melcher; Manelli Denison & Selter, PLLC

(57) ABSTRACT

A method for producing, by a laser that scans the rear side of a transparent object, figures and text that are recessed in the transparent material and that as seen from the outside (5) appear as a raised relief (1) and for which the effect of depth (d, d') depends on the amplitude of a signal superposed the input, frequency-controlled laser power by which the screen pattern is obtained. By an optimal fineness of scanning relative the material of the sign, the figures may obtain a very strong luminescence even at a very low input edge-illumination power. Furthermore, the invention relates to an edge-illuminated electric sign (L1, L2) with a figure produced by the manufacturing method according to the invention. Furthermore, the invention relates to a mounting system in the form of two interacting molding strips (3, 4) for mounting one or more electric signs (L1, L2) manufactured according to the invention.

7 Claims, 6 Drawing Sheets

Fig. 1
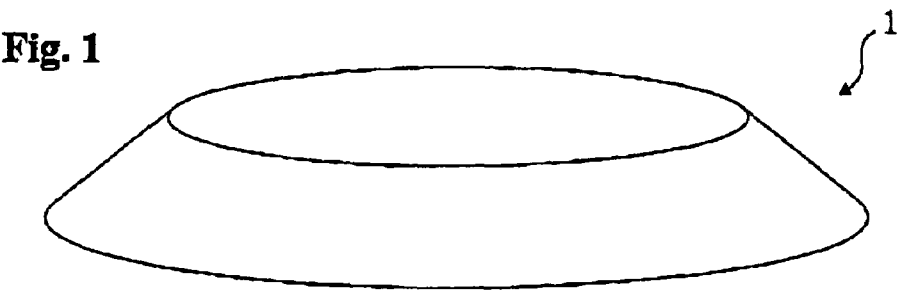
Detail b
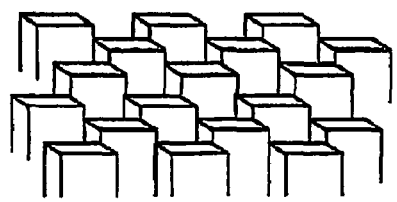
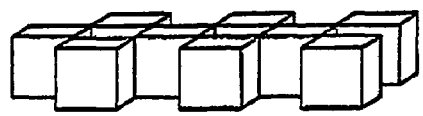
Detail a
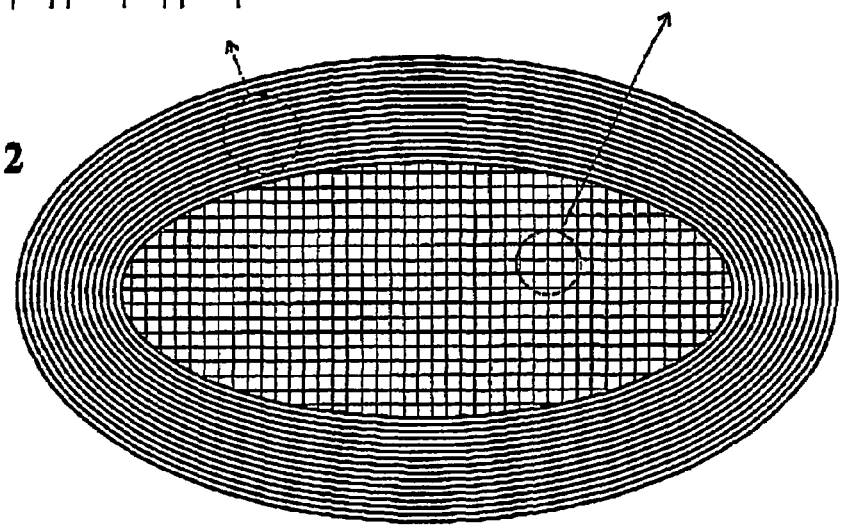
Fig. 2

Detail c

METHOD FOR PRODUCTION OF ELECTRIC SIGNS AND AN ELECTRIC SIGN

TECHNICAL FIELD

The present invention relates to a manufacturing method for production of edge-illuminated signs with figures having a large relief effect and a strong luminescence. The invention also comprises an edge-illuminated electric sign having a figure that has been applied to the electric sign by a manufacturing method according to the invention.

PRIOR ART

Many different embodiments of edge-illuminated signs exist where the desired figure, that may be a text or an image or a combination of both, appears as a luminous figure. One often used embodiment is that the luminous figure appears on a totally transparent base, which gives the impression that the figure is freely floating. There are several different ways of obtaining this effect, whereof some involves applying of the figure by an ink printing method on the rear side of a transparent glass or plastic plate, or that the figure is engraved. Examples of such embodiments are disclosed in GB 2,139, 796 and U.S. Pat. No. 5,842,297.

It is characterising for these known methods that the figure does not get a uniform luminescence. The figure appears by stronger luminescence on the side from which the edge-illumination comes. Efforts have been made by different methods to eliminate this, amongst other ways by using prismatic techniques. In that case, small prismatic recesses of very precise angles have been engraved into the transparent, edge-illuminated plate. If the prismatic recesses have edge surfaces that are angled by 90° in relation to the rear side of the transparent plate, the light can pass without resulting luminescence, while other angles, about 45°, will give the strongest luminescent effect. When the edge-illumination is put out, incoming light through the glass-clear front surface will practically not result in any kind of luminescence, why the figure will be practically invisible. One example of this embodiment is disclosed in US 2001/0049893.

A need also exists for a flexible and easy to use mounting system that admits use of one or more edge-illuminated signs and fast and simple rearrangement of signs.

BRIEF ACCOUNT OF THE INVENTION

It is an object of the present invention to eliminate or at least minimize the above mentioned problems, which is achieved by controlling a laser beam by a master program that makes the laser beam scan a line pattern at the same time as the laser beam is modulated by a frequency that controls the amplitude of the input power to the laser and thereby creates a screen pattern at the same time as an image program is superposed the amplitude-controlled scanning frequency, so that the input laser power with amplitude variations proportional to the desired figure will burn at different depths and thereby give a relief of the figure.

By the method according to the invention, a screen pattern of varying depth can be obtained, whereby e.g. a figure with large relief effect can be achieved. Thanks to the microscopic screen pattern, a figure or image is obtained that is clearly visible to the eye even when the edge-illumination is put out and a light is coming in from the outside, through the front side. By the very strong luminescent effect that can be obtained by the microscopic screen pattern, it is possible to obtain a strongly luminous figure even when the edge-illumination is relatively weak. Thereby, the figure will have a clear and precise appearance even at a very small input power to the edge-illumination and independent of from which direction it comes. In certain cases, e.g. when operation is to take place from accumulators charged by solar arrays, this can be of decisive importance for a long time operation with strong luminescence all the time between recharging, whereby the signs are suitable e.g. for informative text or warning purposes at locations where the power supply is limited.

Yet another purpose of the invention is to provide an edge-illuminated electric sign with figures having a large relief effect and a strong luminescence.

Yet another purpose of the invention is to provide a mounting system that allows a flexible positioning of an electric sign. It is furthermore an object to provide a mounting system that allows simple mounting and demounting of an electric sign.

BRIEF DESCRIPTION OF THE DRAWINGS

In the following, the invention will be described in greater detail with reference to the attached drawing figures, of which:

FIG. 1 shows in perspective a relief of a figure,
FIG. 2 shows in perspective the principle of a screen pattern.

DETAILED DESCRIPTION OF THE INVENTION

At least one or some of the advantages mentioned above can be obtained by providing a transparent material with a screen pattern by a manufacturing method according to the invention.

FIG. 1 shows in perspective a relief 1 of a figure in the form of an oval-shaped protuberance 1 having sloping sides, such as it is desired to appear on the face side of the sign.

Figure 3:
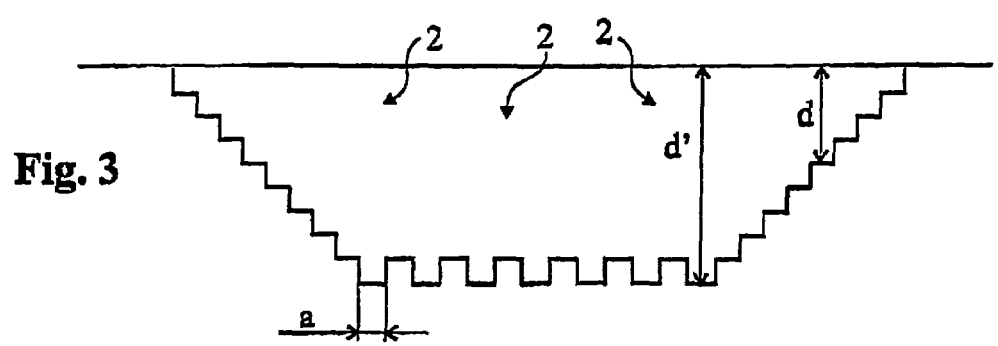
FIG. 3 shows in cross-section the principle of a screen pattern.

FIG. 2 shows in perspective the principle of a screen pattern 2, to obtain this figure, and FIG. 3 shows the principle for this screen pattern 2, in cross-section. Details A and B show the structure of the screen pattern 2 in a planar surface and a sloping surface, respectively. The screen pattern appears as rectangular parallelepipeds, here as cubes, in juxtaposition to each other, but due to the nature of the laser beam, the vertical surfaces shown in the figure will be somewhat sloping, so that the upper surface of a "rectangular parallelepiped" will be somewhat smaller than its opposing lower imaginary counterpart The screen pattern 2 is made by controlling a laser beam by a master program that allows the laser beam to scan a line pattern, in which the distance a between the lines is at most 1 mm, preferably at most 0.5 mm and even more preferred at most 0.2 mm, and that modulates the laser beam power by a frequency that in proportion to the line distance forms a screen pattern where the screen dots are almost as long as they are wide. If one or both of the screen pattern distance and the frequency that modulates the laser beam power is changed, the screen pattern may become of different character, e.g. long and narrow or short and wide. By adding an image program and/or a text program, that superpose(s) the frequency-controlled power modulation, a varying depth d, d' can be obtained.

When the laser beam, as controlled by the master and image programs, scans the rear side of a transparent, light guiding material that is vaporized in proportion to the input amplitude- and frequency-controlled amount of laser energy, figures can be made having the shape of images and text. These figures, in the form of a relief recessed in the transparent material, appear as protruding a relief 1, when the transparent material is viewed from the front side. The effect of depth of the relief 1 depends on the amplitude of the input and superposed laser power at the same time as the desired screen pattern is present all the time. It is this screen pattern that exists on all parts of the formed figure that gives the figure its strong luminescence when edge-illuminated. By adapting the fineness of scanning (the size of the screen pattern) to the material of the sign, the figures may obtain a very strong luminescence even at a very low input edge-illumination power.

An image program that is to superpose the frequency-controlled power modulation, is fed into the laser control unit. The master program allows the laser beam to scan a line pattern at the same time as it gives the required screen pattern. A program written for a desired figure that can consist of text, images, patterns or the like, is fed into the laser control unit and superposes the laser amplitude control, i.e. the input power, whereby the laser vaporizes the transparent material of the sign down to different depths d, d', see FIG. 3.

By frequency modulation of the input power to the laser, the screen pattern is made for which the fineness of scanning depends on the frequency of the modulation and the scanning velocity of the laser over the transparent material. In this way, the optimal fineness of scanning that results in the best luminescence can be achieved independent of the depth of the laser beam penetration into the material.

By modulating the laser beam power, a varying depth can be obtained, whereby a figure can be obtained e.g., which figure can be an image with strong relief effect. Thanks to the very fine screen pattern, a figure or image is obtained that is clearly visible to the eye even when the edge-illumination is put out and a light is coming in from the outside, through the front side. By the very strong luminescence effect obtained thanks to the screen pattern, a strongly luminous figure is obtained even when the edge-illumination is fairly weak, whereby the figure has a clear and precise appearance even at very low power input to the edge-illumination and independent of the direction from which it comes. In certain cases, e.g. when operation is to take place from accumulators charged by solar arrays, this can be of decisive importance for a long time operation with strong luminescence all the time between recharging, whereby the signs are suitable e.g. for informative text or warning purposes at locations where power supply from the power mains is impossible.

The invention also comprises an edge-illuminated electric sign with a figure that has been applied to the rear side of the transparent, light guiding material by aid of a modulated laser beam by the manufacturing method according to the invention. In addition to the above mentioned advantages concerning the stronger and more uniform luminescence of the figure applied onto the transparent material, it has also proven possible to obtain an electric sign having a coloured rear side, also having these features.

Figure 4:
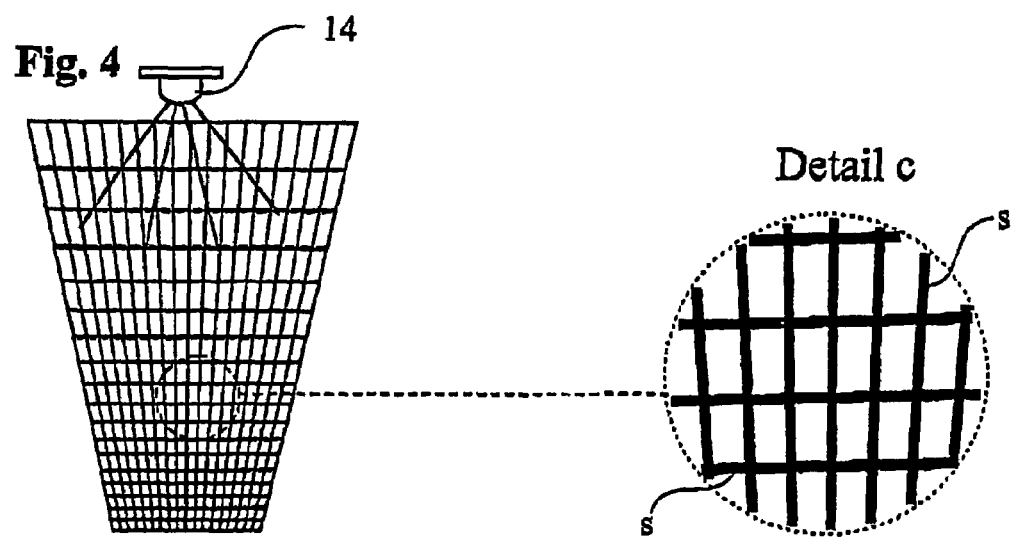
FIG. 4 shows a background film/foil.

FIG. 4 shows the principle of the screen pattern 2 applied onto a background film/foil, by which the above mentioned advantages can be obtained. By applying a film or a foil of desired colour onto the rear side of the electric sign, an electric sign can be obtained in which the figure (not shown) appears against a coloured background. A screen pattern 2, in the form of a fine mesh net, has been produced on this film or foil, by the manufacturing method according to the invention, where the screen pattern has a fineness that is proportional to the luminescence desired in different positions of the background. In the case that a uniform luminescence is desired over the entire surface, the screen pattern is given a fineness that is reciprocally proportional to the distance from the illuminated edge. By removing, by aid of the laser beam, a larger proportion of the material close to the illuminated edge than at a distance from this illuminated edge, the contact surface s between the background film/foil and the transparent material, see detail C, will be smaller close to the illuminated edge than at a distance there from. A smaller contact surface s will result in a weaker luminescence than a larger one. Furthermore, the same principle can be used in order to increase the luminescence of dark background colours relative to bright ones, which may be useful if a multicoloured background film/foil is used.

In addition to this, a preferred embodiment of the invention comprises a mounting system for flexible mounting of the edge-illuminated electric signs. The mounting system, the advantages of which are apparent from the description in connection with the different Figs., comprises a pair of interacting moulding strips 3, 4, shown in cross-section in FIGS. 5a and 5b. It is realised that the mounting system as such can be used also for positioning of other objects than electric signs, e.g. to mount other types of signs (e.g. conventional signs without need of power supply) but also for flexible mounting of completely different kinds of objects, especially in combination with the ingenious principle also to enable power supply, it being realised that objects completely different from light-emitting objects advantageously can be supplied with power/mounted according to this principle. In a preferred embodiment, the moulding strips are manufactured from extruded aluminium. Other suitable materials, such as plastics, are of course also encompassed by the inventive concept.

Figure 5A:
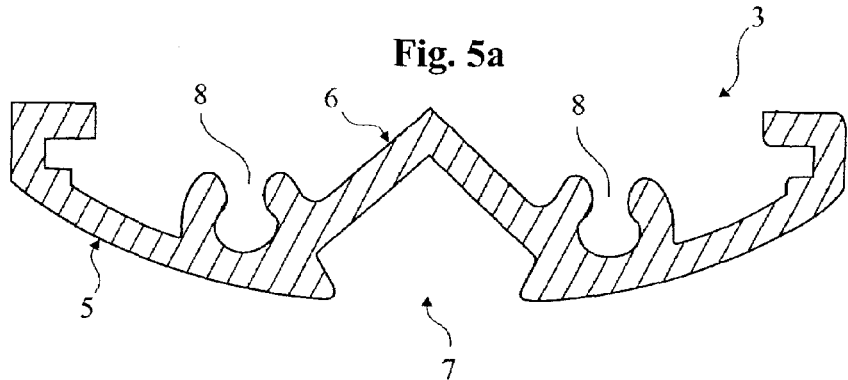
FIGS. 5a, 5b show cross-sections of two moulding strips.

A cross-section of one 3 of the moulding strips, hereinafter denoted mounting strip, is shown in FIG. 5a. The mounting strip 3, that may be of considerable length, sometimes several meters, is intended to be attached in a suitable manner at a location where it is desired to position one or more signs. The mounting strip can be positioned on a wall, horizontally or vertically or at any chosen angle there between. The mounting strip 3 can furthermore be positioned to hang from a roof/ceiling or lie on the floor, as is desired.

The mounting strip 3 comprises an outside 5 and an inside 6. The profile is designed such that a longitudinal groove 7 is centrally placed on the outside 5. The contours of the groove 7 can be resembled by the contours of a diamond. On the inside 6 of the mounting strip 6, on either side of the groove 7, two passages 8 are arranged that run in parallel with the groove 7 and that are arranged to hold an electric conduit. At the end of the mounting strip 3, these passages 8 also constitute a screw attachment for a stop washer that is described in greater detail in connection with FIGS. 9a and 9b.

Figure 5B:
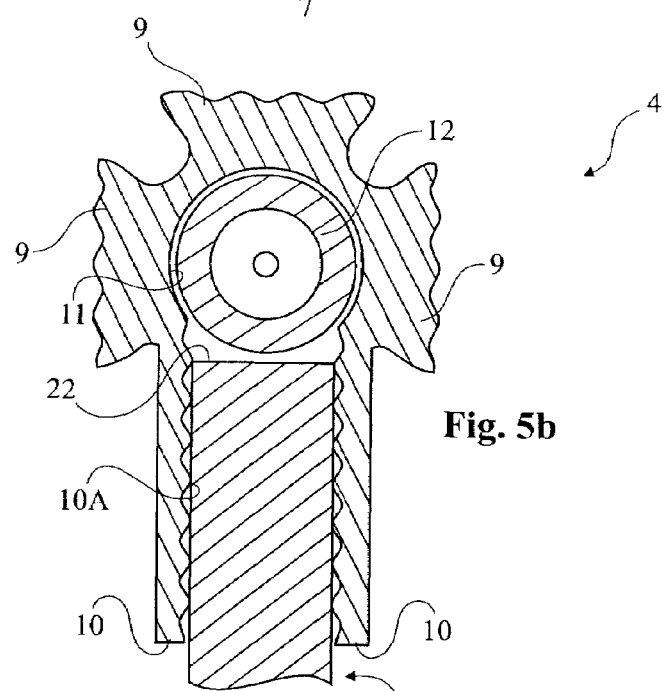
Figures 5C, 5D, 5E:
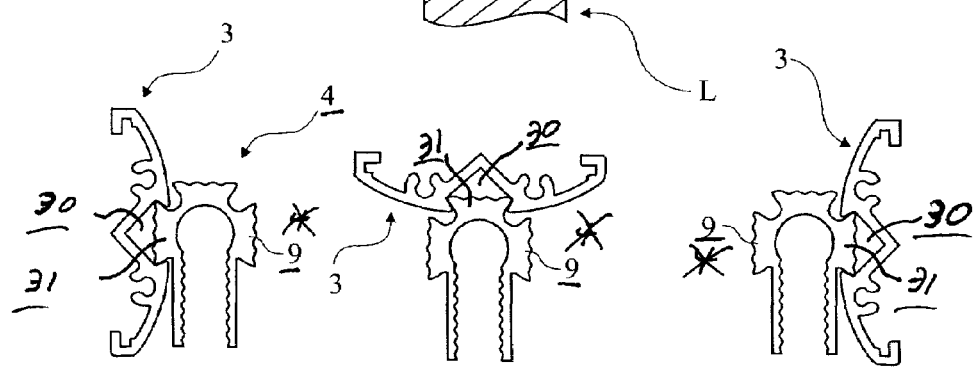
FIGS. 5c-e show different ways to interconnect the two profiles.

FIG. 5b shows a cross-section of the second moulding strip 4, hereinafter denoted sign strip, in which the transparent, light-guiding material that constitutes the electric sign, is to be attached. The length of this moulding strip corresponds essentially to the width of the electric sign to be displayed. The moulding strip is U-shaped and in this embodiment it comprises three uniform protrusions 9, so called dovetails, that are symmetrically positioned at a reciprocal angle of 90° on the outside of the moulding strip. These protrusions 9 have a shaped adapted to the centre groove 7 on the outside 5 of the mounting strip. Depending on which of the three protrusions 9 that is inserted into the groove 7, the electric sign will be positioned in three different directions, as is seen in FIGS. 5*c-e*. Suitably, the sign strip 4 is provided with ribs 10A or some other kind of structure along the inside of the two walls 10 of the U, in order to increase the adhesion when the transparent, light guiding material is attached to the sign strip 4, by glue or silicon e.g. It is of course also possible to attach the transparent material in some other way, such as by screw union or form fit.

The bottom of the U has an inside rounded shape, which circumferentially forms at least a semi-circle, preferably about ¾ of a circle, in order to form a space 11 having a shape adapted to an electrical socket 12, that is inserted axially at the end of the sign strip 4.

Figure 6A:
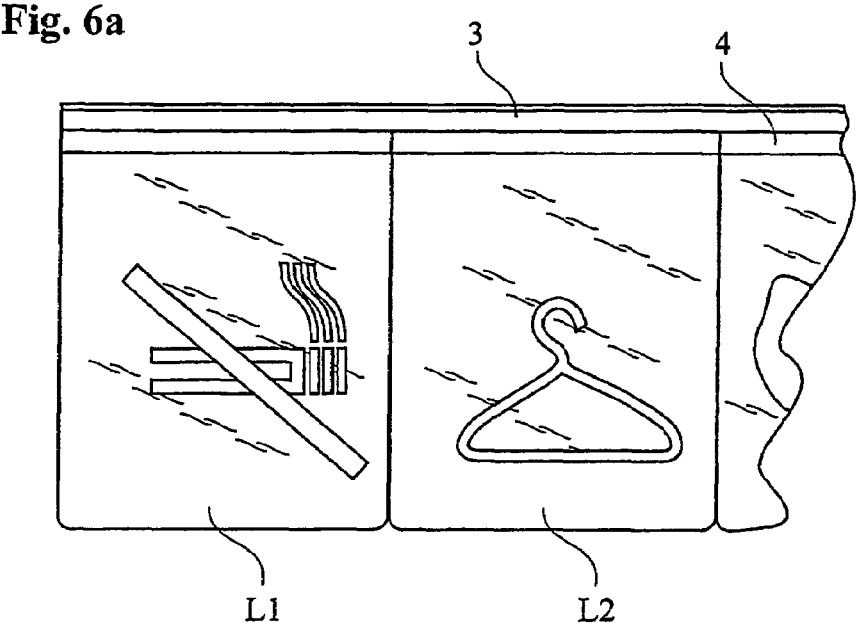
FIG. 6a shows a couple of mounted electric signs.

FIG. 6*a* shows a couple of examples of electric signs L1, L2 according to the invention, that have been mounted in a mounting system according to the invention. Besides enabling a very flexible mounting, the mounting system is designed to enable very easy interconnection of and power supply to a plurality of signs. Thanks to the mounting system, it is possible to rearrange signs quite easily, i.e. to switch signs or arrange them differently.

Figure 6B:
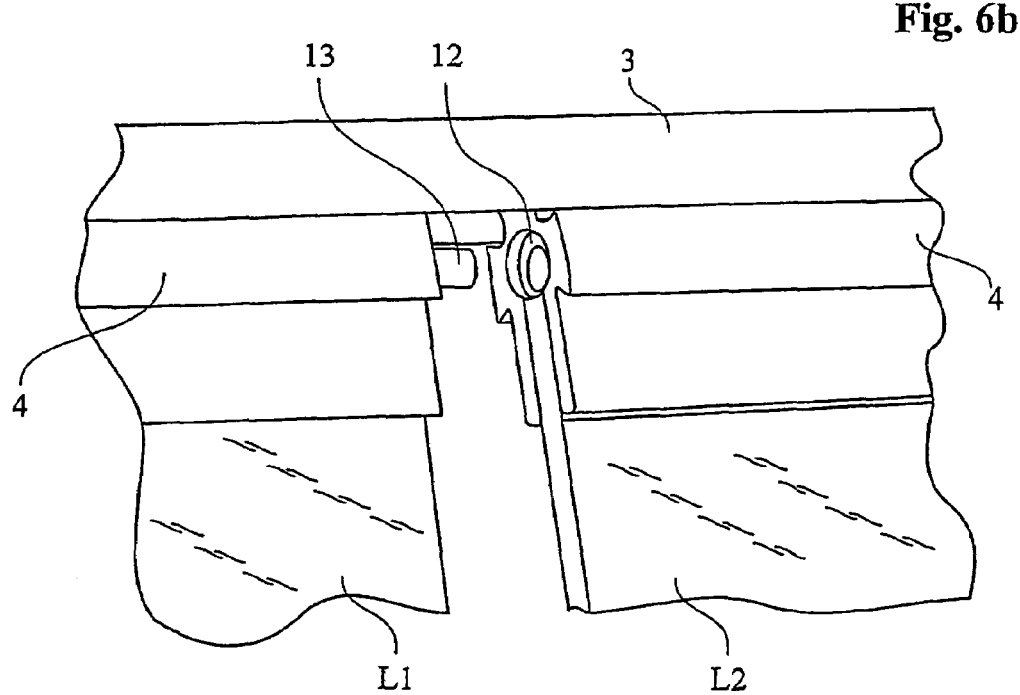
FIG. 6b shows in detail two electric signs that are to be interconnected.

FIG. 6*b* shows in perspective a portion of two electric signs L1, L2, that are to be interconnected in the same mounting strip 3. A connecting plug 13 is inserted in the socket 12 situated at the end of one L2 of the electric signs, to electrically interconnect the two electric signs. When the electric signs are brought together, the connecting plug 13 will be inserted in the socket 12.

Figure 7:
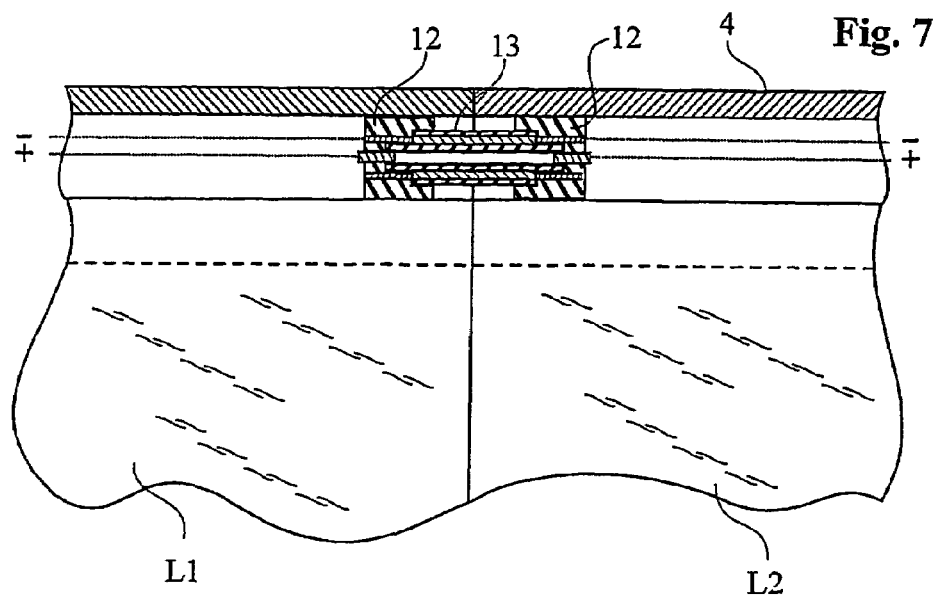
FIG. 7 shows in detail a section of two interconnected electric signs.

FIG. 7 shows an axial cross-section of the joint between two electrically interconnected electric signs L1, L2, their sockets 12 and the connecting plug 13. The sockets 12 and the connecting plug 13 are schematically shown and it should be understood that the invention is not limited to the type of connecting means that is used, but that all connecting means on the market can be used, that enable the electric signs to be interconnected in any order and in different directions relative each other.

Figure 8:
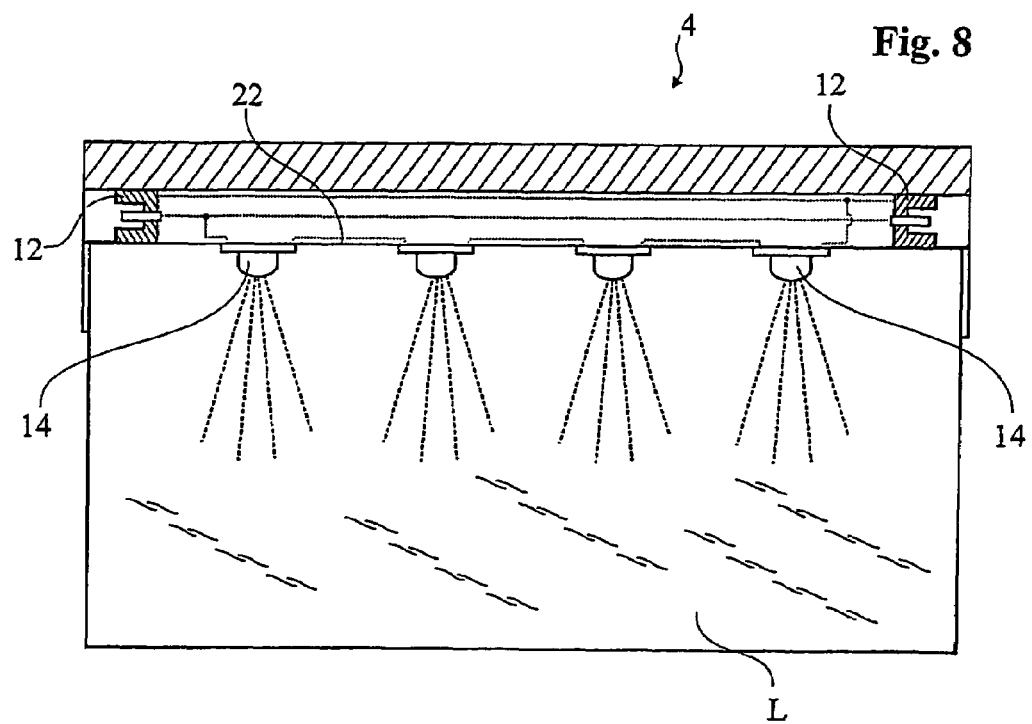
FIG. 8 shows an electric sign.

FIG. 8 shows a longitudinal cross-section of an electric sign L. The transparent material is attached in the U-shaped sign strip 4. Light-emitting elements 14, here in the form of light-emitting diodes, are positioned in connection with the side surface 22 of the transparent material, that is situated inside the sign strip 4. In this embodiment, the light-emitting elements 14 are placed in holes in the side surface 22, but it is also conceivable to arranged a groove in the side surface. In another conceivable embodiment, the light-emitting element(s) 14 is/are placed in connection with the side surface without being recessed in the same. Also, the Figure schematically shows the electrical interconnection of the light-emitting elements 14 and the sockets 12 that are positioned at the ends of the electric sign 4.

Figure 9A:
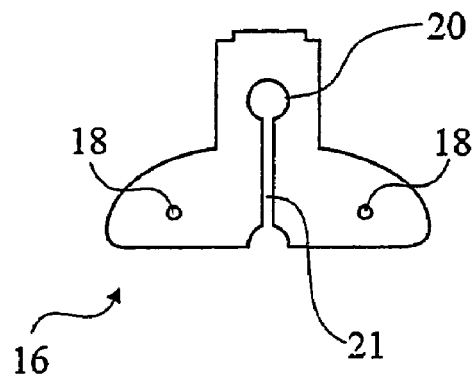
FIGS. 9a, 9b show two stop washers.
Figure 9B:
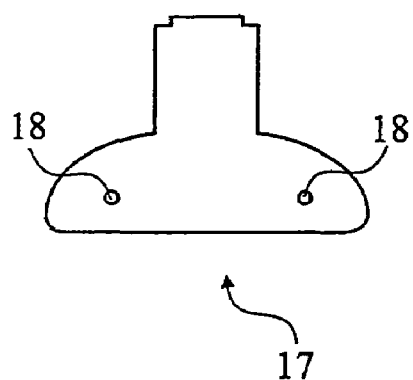
Figure 9C:
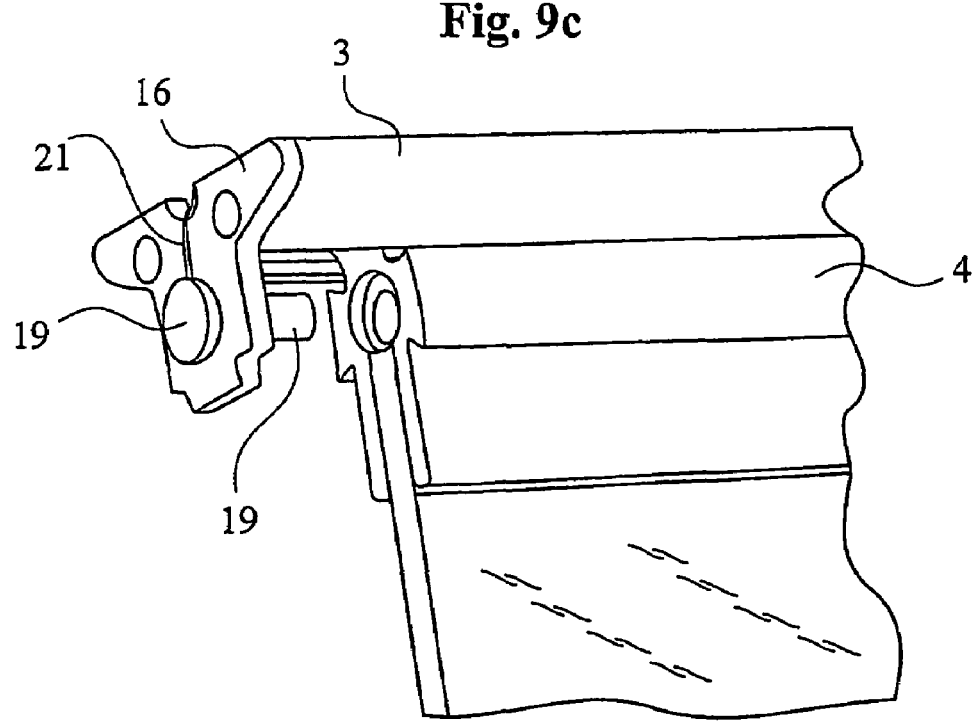
FIG. 9c shows a mounted stop washer.

In order to close the electric circuit and to keep one or more light signs in place in the mounting strip 3, the mounting system comprises a pair of stop washers 16, 17, shown in FIGS. 9*a* and 9*b*. A stop washer is mounted at the end of a mounting strip 3, by being screwed to it, which is shown in FIG. 9*c*. For this purpose, the stop washer 16, 17 is provided with two holes 18 that fit with the two passages 8 on the inside 6 of the mounting strip 3, which passages in this case constitute screw attachments.

The stop washer 16 shown in FIGS. 9*a* and 9*c*, comprises electrical connectors in the form of a second connecting plug 19 that is arranged on the stop washer 16 in connection with a hole 20. The electrical wires 21 are led from the second connecting plug 19, along the outside of the stop washer or in a groove in the same. If desirable, they can be led on over the edge of the base part of the stop washer in order to be led to an adapter or some other power source, while being hidden and protected from damage from the outside. Suitably, the electrical cables 21 are placed in the passages 8 intended therefore, at the rear side of the mounting strip 3.

The invention is not limited to that described above. It is realised that the mounting strip 3 and the sign strip 4 described above, only are part of a preferred embodiment and that the skilled person can find obvious ways to use some other design to fulfil the same objects, the skilled person being familiar with that which is known per se concerning similar mounting arrangements and the principle here described. Furthermore, the mounting strip 3 may for example be wider and be designed with several grooves abreast, and be designed to have a semi-circular shape with grooves resulting in that signs mounted therein point in different radial directions.

Furthermore, the sign strip 4 can be provided with more or fewer connecting means 9 (dovetails), in order to allow the electric signs L1, L2 to be directed in other directions than that shown in the Figures. It is also realised that a connecting means 9 having an outer circular shape, can enable infinitely variable positioning of the sign, by interaction with a groove 7 adapted therefore in the mounting arrangement 3, which groove will give a desired friction/clamp fit. FIGS. 5*c* through 5*e* show a female element 30 and a male element 31.

It is furthermore realised that the invention not is limited to the use of two interacting strips, but that the electric sign can be mounted by any other mounting arrangement. For example, a mounting arrangement that is arranged along a shorter portion of the edge-illuminated side be used, e.g. at the middle or at the respective end parts of the edge-illuminated side. This mounting arrangement would preferably also comprise electrical connectors and one or more light-emitting elements, but these can also be mounted in the electric sign in some other way. In the case that two interacting mounting devices are used, it should be realised that the mounting arrangements that are fixedly mounted in the place where it is desired to position one or more electric signs.

It should also be realised that an electric sign can be either shorter or longer, and that it may comprise more or fewer light-emitting elements 14, than that shown above. Other types of light-emitting elements can be used than light-emitting diodes. Electric signs of differing sizes can be combined in one and the same mounting system.

The invention claimed is:

1. A manufacturing method for production of an edge-illuminated sign with one or more figures having a large relief effect and a strong luminescence, the method comprising:
    providing a transparent, light guiding material having a surface;
    forming a relief of a figure having a surface recessed in the light guiding material by using a laser beam to vaporize the light guiding material in proportion to an input amplitude- and frequency-controlled amount of laser power; and
    controlling the laser beam using a master program that makes the laser beam scan a line pattern for burning light guiding material to create the relief at the same time as the laser beam is modulated by a frequency that controls the amplitude of the input power to the laser and thereby creates a microscopic screen pattern on the surface of the relief at the same time as an image program is superposed to control the amplitude and scanning frequency, so that the input laser power with amplitude variations proportional to the relief of the figure will burn at different depths and thereby form the relief of the figure such that the entire relief of the figure is recessed in the light guiding material, wherein the microscopic screen pattern provides a strong luminescence.

2. A manufacturing method according to claim 1, wherein lines of the line pattern have a distance from each other that is essentially equal to the length of the screen pattern.

3. A manufacturing method according to claim 2, wherein lines of the line pattern have a distance from each other that is essentially equal to about 0.1 mm.

4. A manufacturing method according to claim 1, wherein the lines of the line pattern have a distance from each other that is different from the length of the screen pattern.

5. A manufacturing method according to claim 1, wherein the lines of the line pattern have a distance from each other that are larger or smaller than the length of the screen pattern obtained by the frequency that controls the amplitude of the input laser power and thereby create screen patterns of differing character.

6. A method according to claim 1, wherein the screen pattern comprises rectangular parallelepipeds in juxtaposition to each other and due to the nature of the laser beam vertical surfaces are sloping.

7. A manufacturing method according to claim 1, further comprising mounting the light guiding material in the sign such that the surface faces a rear of the sign, providing an edge-illumination to the light guiding material, and providing a fine mesh to the surface in which the fine mesh has a fineness proportional to the luminescence desired in different positions of the background and that the fineness is also proportional to the distance to the edge-illumination such that the fineness is greater the greater the distance from the edge-illumination.

* * * * *